United States Patent [19]

Lifshits et al.

[11] 4,076,973
[45] Feb. 28, 1978

[54] RESISTANCE TYPE FLASH BUTT WELDER

[76] Inventors: Viktor Senderovich Lifshits, Kavkazsky bulvar, 21, korpus 2, kv.41, Moscow; Alexandr Alexandrovich Sukhanov, prospekt Lenina, 10a, kv.67, Elektrostal Moskovskoi oblasti; Nikolai Makarovich Dergachev, prospekt Juzhny, 7, korpus 1, kv.178, Elektrostal Moskovskoi oblasti; Arkady Alexeevich Pevnev, Oktyabrskaya ulitsa, 13, kv. 44, Elektrostal Moskovskoi oblasti; Vladimir Nikitich Baranov, prospekt Lenina, 30/13, kv. 16, Elektrostal Moskovskoi oblasti; Leonid Pavlovich Shklyanov, ulitsa Zhulyabina, 8, kv.14, Elektrostal Moskovskoi oblasti, all of U.S.S.R.

[21] Appl. No.: 716,257

[22] Filed: Aug. 20, 1976

[51] Int. Cl.² .................................. B23K 11/04
[52] U.S. Cl. ..................................... 219/97
[58] Field of Search ............................. 219/97

[56] References Cited

U.S. PATENT DOCUMENTS 3,748,431   7/1973   Mezbard ........................... 219/97

*Primary Examiner*—Elliot A. Goldberg
*Attorney, Agent, or Firm*—Haseltine, Lake & Waters

[57] ABSTRACT

A welding apparatus employing a self-contained pumping accumulator plant hydraulically associated with a hydraulic ram of a moving clamp transfer gear for gripping pipes being welded. The apparatus employs a device for decreasing the pressure in the hydraulic ram and in a pilot valve during flashing and for increasing pressure during upsetting. The apparatus also employs a a low-pressure high-capacity pump with a filter, a relief valve, a nonreturn valve and an unloading slide valve, two high-pressure low-capacity pumps and a device for cutting the pumps and the unloading slide valve in and out. The pumping accumulator plant and the high-pressure pumps communicate with a main oil plant; a hydraulic control of the slide valves of the clamp hydraulic drives is connected to the pumping accumulator plant. The pilot valve is controlled by a welding process program control actuator.

5 Claims, 2 Drawing Figures

RESISTANCE TYPE FLASH BUTT WELDER

BACKGROUND OF THE INVENTION

The present invention relates to devices for welding articles and more particularly to resistance type continuous flush butt welders for welding articles of heavy sections.

Known in the art are resistance type flash butt welders for welding articles with heavy-cross-sections, comprising moving and a stationary clamps adapted for gripping the articles being welded and fitted with hydraulic drives and slide valves ensuring individual control of the drives. Said welders also employ a gear for transferring the moving clamp during welding, the gear incorporating at least one hydraulic ram controlled by a pilot valve and linked mechanically with a welding process program control actuator. Both the gears for clamping the articles being welded and the moving clamp transfer gear are fed by an oil plant fitted with a filter and a relief valve (e.g., a Soviet-made K-190 welder manufactured by the Kakhovka plant producing electric welding equipment).

A disadvantage of the prior-art resistance type continuous flash butt welders resides in a comparatively low pressure that is employed in their hydraulic systems owing to the presence of a follower hydraulic drive and, hence, in a heavy machine weight.

SUMMARY OF THE INVENTION

The principal object of the present invention is the provision of a resistance type flash butt welder which would enable pipes of large diameters (exceeding 700 mm) to be welded by using a welder of relatively small overall dimensions and weight.

Still another object of the invention is to provide a resistance type flash butt welder which would allow tracing during flashing that is carried out at a low pressure with the upset operation being accomplished at a high pressure in a hydraulic feed system.

Yet another object of the present invention is the provision of a resistance type flash butt welder applicable in terms of its size, for being arranged inside pipes being welded, which would enable the application of said welders under field conditions for constructing trunk pipelines. In this case the welder will move inside the pipeline being built from one butt joint being welded to the other one.

Still another object of the invention is the development of a welder of the above-specified purpose enabling a reduction in the power input of its hydraulic drives with the same prescribed welding productivity.

A further object of the invention is to provide a resistance type flash butt welder ensuring better quality of welded pipe joints by obviating any standstill during the transfer of a moving welder clamp when passing over from the flashing to the upsetting operation, this being associated with the switching over of hydraulic drives from a low to a high feed pressures.

A still further object of the invention is the provision of a welder featuring a higher reliability in service by controlling with the aid of a respective apparatus of a hydraulic circuit operating at a low pressure, with welder hydraulic drives opening at a high pressure.

Accordingly it is an object of the invention to provide a welder featuring the above advantages attainable without expensive changes in its hydraulic system by means of available structural means.

The principal features of the invention are directed to a resistance type flash butt welding apparatus, comprising moving and stationary clamps adapted for gripping articles being welded; hydraulic drives controlling the clamping and releasing of said articles being welded and provided with slide valves ensuring individual control of said hydraulic drives; gear means for transferring the moving clamp with respect to the stationary one, said gear means comprising at least one hydraulic ram, pilot valve means for controlling said hydraulic ram, control means employing an actuator means for controlling said pilot valve, and first oil plant means feeding said hydraulic drives; said apparatus including: a second self-contained pumping accumulator plant having a relief valve in its delivery circuit, and second plant being associated hydraulically with said hydraulic ram of the moving clamp transfer gear means; a device for decreasing a pressure in the hydraulic ram of said moving clamp transfer gear means and in the pilot valve during flashing of the articles being welded and for increasing said pressure during upsetting of said articles; said device being a differential circuit adapted for feeding said hydraulic ram of the moving clamp transfer gear means through said pilot valve means, being fitted with an additional slide valve and a nonreturn valve, for switching a hydraulic ram drain from the differential ram feed circuit to free drain at the instant the flashing operation is at an end, said device being fed from said second self-contained pumping accumulator plant; a low-pressure high-capacity pump with a filter, a relief valve, a nonreturn valve and an unloading slide valve, said high capacity pump being adapted to feed said hydraulic drives of both the moving and stationary clamps; high pressure, low-capacity pumps with relief valves, said pumps being associated hydraulically with said clamp hydraulic drives; a device for automatic switching over the clamp hydraulic ram feed circuit from the low-pressure pump operating during preliminary clamping of the articles being welded to the high-pressure pumps operating during final clamping of said articles; said device being adapted for switching over the oil pumps and comprising a low-pressure pump unloading slide valve being associated hydraulically with said pressure pump and electrically with the high-pressure pump motors for switching them on at the moment the low-pressure pump is being unloaded; said second pumping accumulator plant and high-pressure pumps being connected to the first oil plant, with a hydraulic control of the slide valves of the moving and stationary clamps being connected to the second pumping accumulator plant.

The above embodiment makes it possible to provide a welder which, owing to the application of a differential feed circuit of the hydraulic ram of the moving clamp transfer gear, based on the pilot valve and additional slide valve, switching over a hydraulic ram drain from the differential circuit diagram to a free drain at the end of the flashing operation, ensures a minimum possible power input alongside with minimum overall dimensions and high preset welding productivity. Moreover, the clamping gear of each of the articles being welded employs two pumps; the low-pressure high-capacity pump ensuring quick charging of the drive hydraulic ram during preliminary clamping, and the high-pressure low-capacity pump that is used for developing a requisite high pressure during final clamping of said articles.

Also within the scope of invention is a device for decreasing the pressure in a hydraulic ram of a moving clamp transfer gear and in a pilot valve during flashing and for increasing said pressure during upsetting comprises an intensifier, an additional nonreturn valve and a three-position slide valve controlled by signals received from a welding process program control actuator, with an inlet of the pilot valve being connected to a rodless space of the hydraulic ram of the moving clamp transfer gear, one of the two spaces of the pilot valve being connected to a drain and the other one to the outlets of said additional nonreturn valve and of the intensifier, a rod space of the moving clamp transfer gear hydraulic ram being connected, during flashing and when said hydraulic ram returns to its initial position, through the three-position slide valve to a self-contained pumping accumulator plant and to the inlet of said additional nonreturn valve, and during upsetting to the drain, the intensifier inlet being coupled, during flashing and when the hydraulic ram is being returned to its initial position, through said three-position slide valve with the drain and during upsetting with said pumping accumulator plant.

The above construction concept ensures one of the alternative optimum embodiments of the device for decreasing the pressure during flashing and increasing it during upsetting which makes it possible to observe a prescribed sequence of operations with the help of inexpensive and available members of a hydraulic system.

According to another feature of the welder there is a device for decreasing the pressure in a hydraulic ram comprises a cutoff valve instead of an intensifier.

The above embodiment enables the application in a changeover switch of control facilities operating at a low pressure, with the hydraulic drive of the moving clamp transfer gear using a high pressure and with the intensifier being advisable to be utilized for welding pipes of relatively large diameters (exceeding 1000 mm).

The use for that purpose of the cutoff valve is preferable while welding pipes in a relatively small diameter range, insofar as in this case it is just sufficiently to differentiate the high and low pressures.

Still another aspect of the invention, is characterized by that an inlet of a nonreturn valve of a self-contained pumping accumulator plant of a moving clamp transfer gear is connected to a rod space of a hydraulic ram of said moving clamp transfer gear.

By connecting the inlet of the nonreturn valve of the second pumping accumulator plant to the rod space of the moving clamp transfer gear hydraulic ram it is possible to obviate all standstills of said moving pipe clamp when switching over from a low to a high pressure while passing over from the flashing of the pipes being welded to their upsetting; it also allows relieving the second plant feed pump during upsetting and when the welder is returned to its initial position.

And, finally, according to another feature, there is provided a device for automatic cutting in and out of high-pressure pumps after preliminary clamping and releasing of the articles being welded by each clamp and of a low-pressure pump unloading slide valve comprises two additional nonreturn valves and a pressure-sensitive relay whose inlets are connected to a low-pressure pump nonreturn valve outlet, while the outlets of each of the two nonreturn valves are connected accordingly to a high-pressure pump delivery line and to an inlet of a corresponding slide valve of the moving and stationary clamp hydraulic drives, with high-pressure pump electric motors, the pressure-sensitive relay, electromagnets of the hydraulic drive slide valves of the moving and stationary clamps, as well as the unloading slide valve electromagnet of the low-pressure pump being interlocked electrically.

Said construction concept provides an optimum embodiment of the device controlling the cutting in and out of the high-pressure pumps and of the low-pressure pump unloading slide valve, with the proposed circuitry comprising a minimum number of required hydraulic circuit elements, cut-in so as to ensure their reliable tripping.

The nature of the invention will be clear from the following detailed description of its particular embodiment to be had in conjunction with the accompanying drawings, in which:

IN THE DRAWINGS

PREFERRED EMBODIMENT OF THE INVENTION

Figure 1:
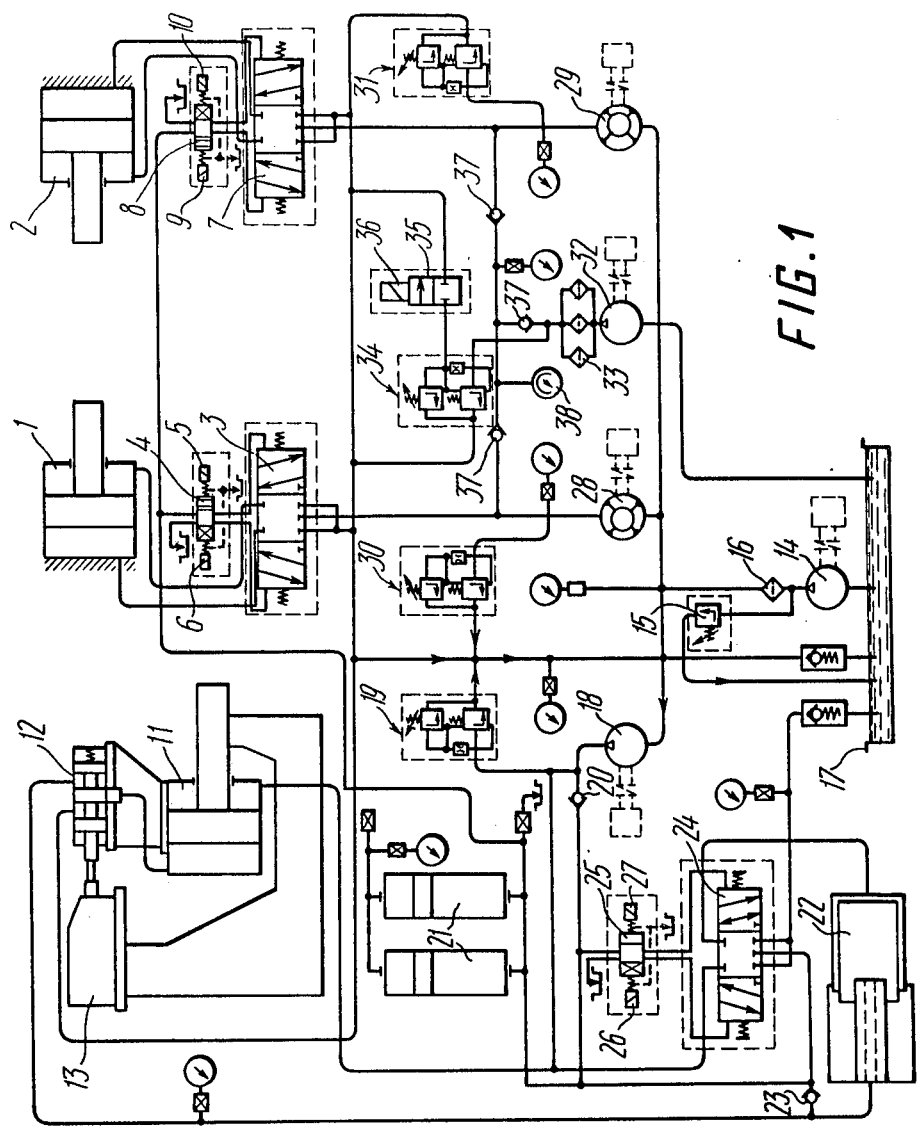
FIG. 1 shows a principle hydraulic circuit diagram of a resistance type butt welder, comprising an intensifier, according to the invention.

A resistance type flash butt welder comprises a moving and a stationary clamps adapted for gripping articles being welded, a hydraulic ram 1 of a moving clamp drive locking mechanism and a hydraulic ram 2 of a stationary clamp locking mechanism. The hydraulic ram 1 is controlled by means of a slide valve 3 which in turn is under the control of a slide valve 4 with electromagnets 5 and 6. The hydraulic ram 2 is controlled by a slide valve 7 and a slide valve 8 having electromagnets 9 and 10. A gear for transferring the moving clamp during the welding process comprises a hydraulic ram 11 controlled by a pilot valve 12 that is linked kinematically with a welding process program control actuator 13. Working fluid is fed to the hydraulic rams 11, 1 and 2 from an oil plant, comprising a pump 14, a relief valve 15, a filter 16 and an oil tank 17, with the fluid being supplied to the hydraulic ram 11 from said oil plant not directly but through an additional self-contained pumping accumulator plant, comprising a pump 18, a relief valve 19, a nonreturn valve 20 and hydropneumatic accumulators 21. A device for automatic decreasing of a pressure in the hydraulic ram 11 of the moving clamp transfer gear and in the pilot valve 12 during flashing and for increasing said pressure during upsetting comprises an intensifier 22 whose outlet is coupled with that of a nonreturn valve 23, an intensifier inlet being connected to a three-position slide valve 24 which in turn is controlled by a slide valve 25 with electromagnets 26 and 27. The latter (electromagnets 26 and 27) are controlled by signals of the actuator 13.

The hydraulic rams 1 and 2 are fed from the oil plant not directly but with the aid of corresponding high-pressure low-capacity pumps 28 and 29 whose delivery pipes are fitted with relief valves 30 and 31. Working fluid is pumped into the hydraulic rams 1 and 2 through filters 33 by a low-pressure high-capacity pum 32. The delivery pipe of the pump 32 is fitted with a relief valve 34 and with a pump unloading slide valve 35 which in turn is controlled by an electromagnet 36. A device for cutting in and out the high-pressure pumps accordingly after preliminary clamping and releasing of the articles being welded by each clamp, as well as for switching on and off of the slide valve 35 adapted for unloading the low-pressure pump 32 comprises three nonreturn valves 37 and a pressure-sensitive relay 38.

Figure 2:
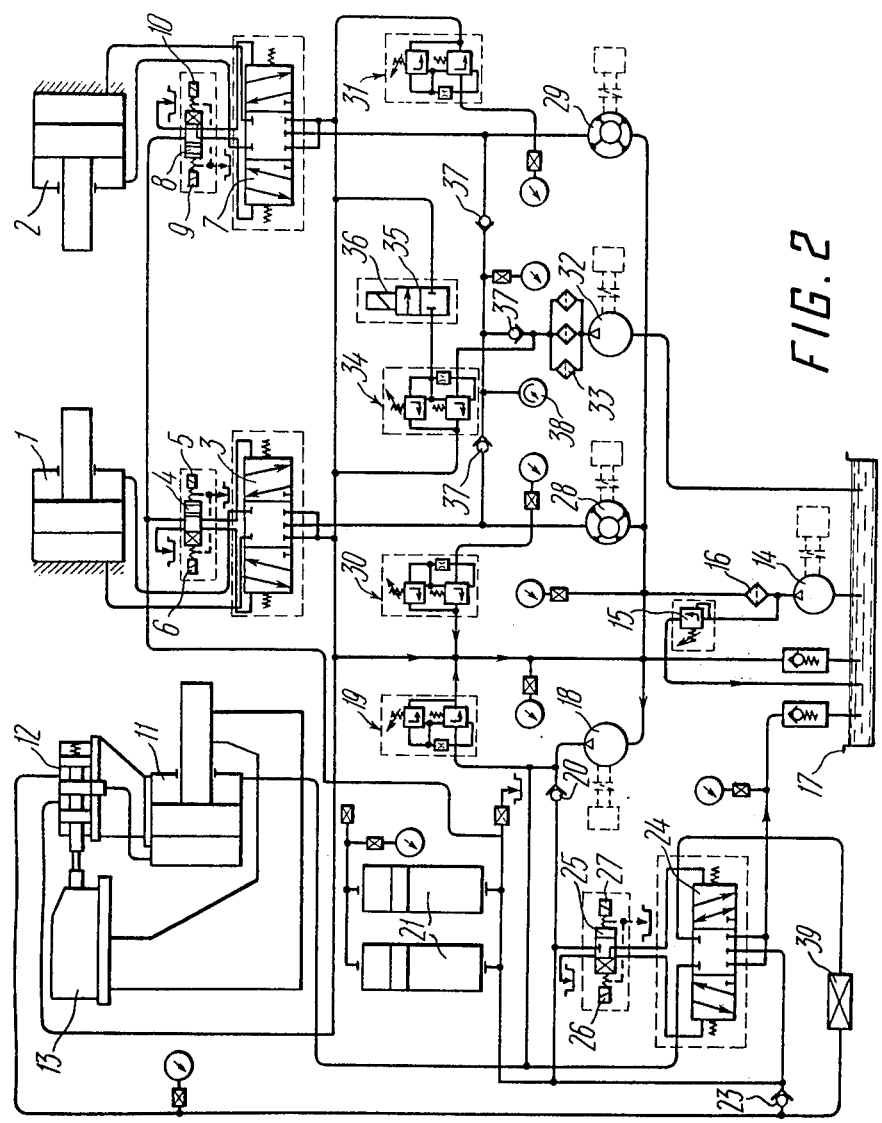
FIG. 2 is a principle hydraulic circuit diagram of a resistance type butt welder without an intensifier, according to the invention.

A principle hydraulic circuit diagram of a resistance type butt welder is given in FIG. 2, said diagram differing from that presented in FIG. 1 in that the intensifier 22 is replaced by a cutoff valve 39.

Prior to welding articles to be welded they are clamped in the moving and stationary clamps of the welder. To this end a signal is sent to the electromagnet 5 and a rod of the slide valve 3 is brought into its extreme position admitting fluid into the rodless space of the hydraulic ram 1. At this moment the pumps 28 and 32 are operating, the slide valve 35 adapted for unloading the pump 32 being closed. As soon as the moving clamp touches the article being welded and the pressure in the hydraulic ram 1 will attain a value prescribed by the relief valve 34, the pressure-sensitive relay 38 will operate and send a command signal to the electromagnet 36 which in turn will open the slide valve 35 for unloading the pump 32 which from that moment will run idle. Further clamping of the article being welded with a prescribed force will be effected with the aid of the working fluid fed by the pump 28. As soon as the clamping force acting on the article being welded reaches a preset value, the relief valve 30 will operate and excess fluid will be discharged into the tank 17.

The process of clamping the article being welded in the stationary clamp is similar to the above outlined gripping in the moving clamp, the only difference lying in that when an article is being clamped in the stationary clamp the pumps 32 and 29 are operating with the control functions being effected by the slide valves 8 and 7.

After the articles being welded have been gripped in the machine clamps a welding transformer is energized, with the welding process program control sending a command signal to its actuator 13 for changing the length (shortening) of a spindle that is found in contact with the rod of the pilot valve 12. At this moment the pump 14 is in operation supplying fluid to the pumping accumulator plant, and the pump 18 charges the hydropneumatic accumulators 21, with the plunger of the three-position slide valve 24 being set to its extreme left position corresponding to flashing. Under the effect of a spring the rod of the pilot valve 12 is shifted towards the actuator 13 (to the left) admitting thereby the working fluid into the rodless space of the hydraulic ram 11. At this instant the rod space of said hydraulic ram 11 communicates with the hydropneumatic accumulators 21 through the slide valve 24. Since the areas of said spaces (the rod and rodless spaces) of the hydraulic ram 11 differ from each other, the control circuit diagram of the hydraulic ram 11 assumes in the course of flashing a differential nature, with the pilot valve 12 operating at a pressure difference in the rod and rodless spaces (a low pressure). At the moment the welding process program control sends a command signal for upsetting (on completion of the flashing program) the spindle of the actuator 13 is shortened abruptly (for an upset value) and after the electromagnet 27 has been cut in, the slide valve 24 is brought into its second extreme right position connecting thereby the rod space of the hydraulic ram 11 to a drain and the hydropneumatic accumulators 27 to the inlet of the working space of the intensifier 22. Upsetting continues (at a high pressure) until the pilot valve 12 is reset by a feedback to a zero position, whereupon the supply of the working fluid to the hydraulic ram 11 is cut off. Welding completed, the articles to be welded are released from both the moving and stationary clamps. To this end a signal is sent to the electromagnets 6 and 10 of the slide valves 4 and 8, whereupon the rods of the slide valves 3 and 7 are brought into their second extreme position admitting the working fluid into the rod spaces of the rams 1 and 2 and connecting the rodless spaces of said rams to the tank 17. At this moment the pumps 28 and 29 are in operation. As soon as the pressure in the hydraulic system, upon shifting the pistons of the rams 1 and 2, drops to a value prescribed by the relief valves 30 and 31, the pressure-sensitive relay 38 will operate and send a signal to the electromagnet 36. The latter (electromagnet 36) will close the slide valve 35 and cut out the high-pressure pumps 28 and 29. Further travel of the pistons of the rams 1 and 2 is due to the pressure developed by the pump 32.

To return the hydraulic ram 11 to its initial position the welding process program control sends a command signal to the actuator 13 and electromagnet 26. As a result, the actuator spindle lengthens shifting the slide valve rod to the right and compressing its spring. The rodless space of the hydraulic ram 11 is therefore connected to the tank 17, its rod space communicating through the slide valve 24, whose plunger is at this moment in the extreme left position with the hydropneumatic accumulators 21. In this case the inlet of the intensifier 22 is coupled with the drain (the tank 17) and its outlet with the hydropneumatic accumulators 21. The hydraulic ram 11 (of the moving clamp) is being operated to return to its initial position (at an intermediate pressure) until the pilot valve 12 is reset by the feedback a zero position. As the moving clamp is being brought into its initial position, the intensifier 22 is charged, since its inlet is connected to the drain and the outlet to the hydropneumatic accumulators 21. If the pumps ensuring the clamping of pipes being welded during the welding process fail, said pipes cannot be released by acting on the slide valves of the pipe clamping hydraulic drive with the aid of said pumps. To overcome said disadvantage and to afford the possibility of releasing the pipes even in the case of failure of the pumps, feeding the hydraulic drive of the machine clamping gear, it is proposed to control the slide valves from the pumping accumulator plant.

With a view to enhancing functional reliability of the hydraulic system it is expedient that an excess pressure be created at the pump suction. To reduce the system overall dimensions said excess pressure that is to be developed at the suction of both the high-pressure pump of the pipe clamping hydraulic drives and of the pumping accumulator plant is provided by one common pump.

While we have illustrated a preferred embodiment of the invention, many modifications may be made without departing from the spirit of the invention. We do not wish to be limited to the precise details of construction set forth but desire to avail ourselves of all changes within the scope of the appended claims.

What we claim is:

1. A resistance type flash butt welding apparatus, comprising moving and stationary clamps adapted for gripping articles being welded; hydraulic drives controlling the clamping and releasing of said articles being welded and provided with slide valves ensuring individual control of said hydraulic drives; gear means for transferring the moving clamp with respect to the stationary one, said gear means comprising at least one hydraulic ram, pilot valve means for controlling said hydraulic ram, control means employing an actuator means for controlling said pilot valve, and first oil plant means feeding said hydraulic drives; said apparatus including: a second self-contained pumping accumulator plant having a relief valve in its delivery circuit, and second plant being associated hydraulically with said hydraulic ram of the moving clamp transfer gear means; a device for decreasing pressure in the hydraulic ram of said moving clamp transfer gear means and in the pilot valve during flashing of the articles being welded and for increasing said pressure during upsetting of said articles; said device being a differential circuit adapted for feeding said hydraulic ram of the moving clamp transfer gear means through said pilot valve means, being fitted with an additional slide valve and a nonreturn valve for switching a hydraulic ram drain from the differential ram feed circuit to free drain at the instant the flashing operation is at an end, said device being fed from said second self-contained pumping accumulator plant; a low-pressure high-capacity pump with a filter, a relief valve, a nonreturn valve and an unloading slide valve, said high capacity pump being adapted to feed said hydraulic drives of both the moving and stationary clamps; high-pressure, low-capacity pumps with relief valves, said pumps being associated hydraulically with said clamp hydraulic drives; a device for automatic switching over the clamp hydraulic ram feed circuit from the low-pressure pump operating during preliminary clamping of the articles being welded to the high-pressure pumps operating during final clamping of said articles; said device being adapted for switching over the oil pumps and comprising a low-pressure pump unloading slide valve being associated hydraulically with said low pressure pump and electrically with the high-pressure pump motors for switching them on at the moment the low-pressure pump is being unloaded; said second pumping accumulator plant and high-pressure pumps being connected to the first oil plant, with a hydraulic control of the slide valves of the moving and stationary clamps being connected to the second pumping accumulator plant.

2. An apparatus as claimed in claim 1, wherein: means are provided for decreasing the pressure in the hydraulic ram of the moving clamp transfer gear means and in the pilot valve means during flashing and for increasing said pressure during upsetting comprises an intensifier, an additional nonreturn valve and a three-position slide valve controlled by signals from program control actuator means, with a pilot valve inlet being connected to a rodless space of the hydraulic ram of said moving clamp transfer gear means, one of the two spaces of said pilot valve to a drain and the other one to the outlets of said additional nonreturn valve and intensifier, a rod space of said hydraulic ram of the gear means for transferring the moving clamp during flashing and when the hydraulic ram is being returned to its initial position being connected through the three-position slide valve to the self-contained pumping accumulator plant and to the additional nonreturn valve inlet and during upsetting to the drain, with the intensifier inlet being coupled during flashing and when said hydraulic ram is being returned to its initial position through said three-position slide valve with the drain and during upsetting with the pumping accumulator plant.

3. A resistance type flash butt welding apparatus, for decreasing the pressure in hydraulic ram means comprising moving and stationary clamps adapted for gripping articles being welded; hydraulic drives controlling the clamping and releasing of said articles being welded and provided with slide valves ensuring individual control of said hydraulic drives; gear means for transferring the moving clamp with respect to the stationary one, said gear means comprising at least one hydraulic ram, pilot valve means for controlling said hydraulic ram, control means employing an actuator means for controlling said pilot valve, and first oil plant means feeding said hydraulic drives; said apparatus including: a second selfcontained pumping accumulator plant having a relief valve in its delivery circuit, and second plant being associated hydraulically with said hydraulic ram of the moving clamp transfer gear means; a cutoff valve for decreasing pressure in the hydraulic ram of said moving clamp transfer gear means and in the pilot valve during flashing of the articles being welded and for increasing said pressure during upsetting of said articles; an additional nonreturn valve and a three-position slide valve controlled by signals from the program control actuator means, with a pilot valve inlet being connected to a rodless space of the hydraulic ram of said moving clamp transfer gear means, one of the two spaces of said pilot valve to a drain and the other one to the outlets of said additional nonreturn valve and said cutoff valve, a rod space of said hydraulic ram of the gear means for transferring the moving clamp during flashing and when the hydraulic ram is being returned to its initial position being connected through the three-position slide valve to the self-contained pumping accumulator plant and to the additional nonreturn valve inlet and during upsetting to the drain, with the said cutoff valve inlet being coupled during flashing and when said hydraulic ram is being returned to its initial position through said three-position slide valve with the drain and during upsetting with the pumping accumulator plant.

4. An apparatus as claimed in claim 1, wherein: the inlet of the nonreturn valve of the self-contained pumping accumulator plant of the moving clamp transfer gear means is connected to the rod space of said moving clamp transfer gear hydraulic ram.

5. An apparatus as claimed in claim 1, wherein: the device for automatic switching on and off of the high-pressure pump after preliminary clamping and releasing of the articles being welded by each of said clamps and for cutting in and out of the low-pressure pump unloading slide valve comprises, two additional nonreturn valves and a pressure-sensitive relay whose inlets are connected to the outlet of the low-pressure pump nonreturn valve, the outlets of each of the two said nonreturn valves being connected to a high-pressure pump delivery line and to the inlet of the corresponding slide valve of the moving and stationary clamp hydraulic drives, the high-pressure pump electric motors, pressure-sensitive relay, the slide valves of said moving and stationary clamp hydraulic drives and that of the low-pressure pump unloading slide valve being interlocked electrically by electromagnetic means.

* * * * *